US012734647B2

(12) United States Patent
Li

(10) Patent No.: US 12,734,647 B2
(45) Date of Patent: Sep. 15, 2026

(54) SWITCH-POSITIONING DEVICE OF A RATCHET WRENCH

(71) Applicant: Yi-Min Li, Taichung City (TW)

(72) Inventor: Yi-Min Li, Taichung City (TW)

( * ) Notice: Subject to any disclaimer, the term of this patent is extended or adjusted under 35 U.S.C. 154(b) by 586 days.

(21) Appl. No.: 18/218,594

(22) Filed: Jul. 6, 2023

(65) Prior Publication Data

US 2025/0010432 A1 Jan. 9, 2025

(51) Int. Cl.
*B25B 13/46* (2006.01)

(52) U.S. Cl.
CPC .................................. *B25B 13/463* (2013.01)

(58) Field of Classification Search
CPC .................................................... B25B 13/463
USPC ..................................................... 81/60–63.2
See application file for complete search history.

(56) References Cited

U.S. PATENT DOCUMENTS 3,436,992 A * 4/1969 Over ..................... B25B 13/463 81/63.1
5,533,427 A * 7/1996 Chow .................. B25B 13/463 81/63
5,535,646 A * 7/1996 Allen .................... B25B 21/004 81/57.39
6,457,389 B1 * 10/2002 Hu ........................ B25B 13/463 81/63
10,828,751 B2 * 11/2020 Abel ..................... B25B 13/468

* cited by examiner

*Primary Examiner* — Hadi Shakeri
(74) *Attorney, Agent, or Firm* — Bruce Stone LLP; Joseph A. Bruce

(57) ABSTRACT

A ratchet wrench includes a head, a toothed wheel, a pawl and a switch. The head includes two bores in communication with a pothole in communication with a chamber via a channel. The channel includes a broad section between two tapered sections. The toothed wheel is rotatable in the chamber. The switch is pivotable in the pothole and includes a tunnel with a first end in communication with the broad section of the channel and a second end in communication with the pothole. A spring is compressed between a detent and a ball. The detent includes an end connected to the pawl and another end movable in the tunnel. The ball includes a portion in the tunnel and another portion insertable in a selected one of the bores when the detent moves the pawl into a corresponding one of the tapered sections of the channel.

5 Claims, 9 Drawing Sheets

SWITCH-POSITIONING DEVICE OF A RATCHET WRENCH

BACKGROUND OF INVENTION

1. Field of Invention

The present invention relates to a ratchet wrench and, more particularly, to a switch-positioning device of a ratchet wrench.

RELATED PRIOR ART

Referring to FIG. 8, a conventional ratchet wrench 80 includes a head, a switch 81, a pawl 85 and a toothed wheel 86. The head includes a pothole 82 in communication with a chamber via a tunnel. The tunnel is a crescent space with two tapered sections. The toothed wheel 86 is rotatable in the chamber. The pawl 85 is movable between the tapered sections of the tunnel. The switch 81 is pivotable in the pothole 82. A spring 83 and a detent 84 are located in the switch 81. The spring 83 biases the detent 84 to the pawl 85 so that the pawl 85 engages with the toothed wheel 86 and abuts against an internal face of the ratchet wrench 80.

The switch 81 is in a first active position where a first section of the pawl 85 is inserted in the first tapered section of the tunnel. A force is exerted on the ratchet wrench 80 in a first direction indicated by an arrow head 87. The internal face of the ratchet wrench 80 exerts a torque on the pawl 85. The pawl 85 is jammed between the internal face of the ratchet wrench 80 and the toothed wheel 86 so that the internal face of the ratchet wrench 80 pivots toothed wheel 86 via the pawl 85 in a tighten direction indicated by an arrow head 88. The tightening direction 88 is identical to the first direction 87. The ratchet wrench 80 is allowed to pivot and tighten a workpiece such as a threaded bolt, nut or extensive rod.

Referring to FIG. 9, the ratchet wrench 80 is pivoted in a second direction indicated by an arrow head 89. The second direction is opposite to the first direction. The pawl 85 is not jammed between the internal face of the ratchet wrench 80 and the toothed wheel 86 so that the internal face of the toothed wheel 80 does not pivot the toothed wheel 86 via the pawl 85.

However, there is no device for keeping the switch in the first position. The switch 81 can accidentally be moved to a second position where a second section of the pawl 85 is located in the second tapered section of the tunnel. Hence, the rachet wrench 80 can accidentally fails to rotate the toothed wheel 86 in the first direction.

The present invention is therefore intended to obviate or at least alleviate the problems encountered in the prior art.

SUMMARY OF INVENTION

It is the primary objective of the present invention to provide a reliable ratchet wrench.

To achieve the foregoing objective, a ratchet wrench includes a head, a toothed wheel, a pawl and a switch. The head includes two bores in communication with a pothole in communication with a chamber via a channel. The channel includes a broad section between two tapered sections. The toothed wheel is rotatable in the chamber. The switch is pivotable in the pothole and includes a tunnel with a first end in communication with the broad section of the channel and a second end in communication with the pothole. A spring is compressed between a detent and a ball. The detent includes an end connected to the pawl and another end movable in the tunnel. The ball includes a portion in the tunnel and another portion insertable in a selected one of the bores when the detent moves the pawl into a corresponding one of the tapered sections of the channel.

Other objectives, advantages and features of the present invention will be apparent from the following description referring to the attached drawings.

BRIEF DESCRIPTION OF DRAWINGS

The present invention will be described via detailed illustration of two embodiments versus the prior art referring to the drawings wherein.

DETAILED DESCRIPTION OF EMBODIMENTS

Figure 1:
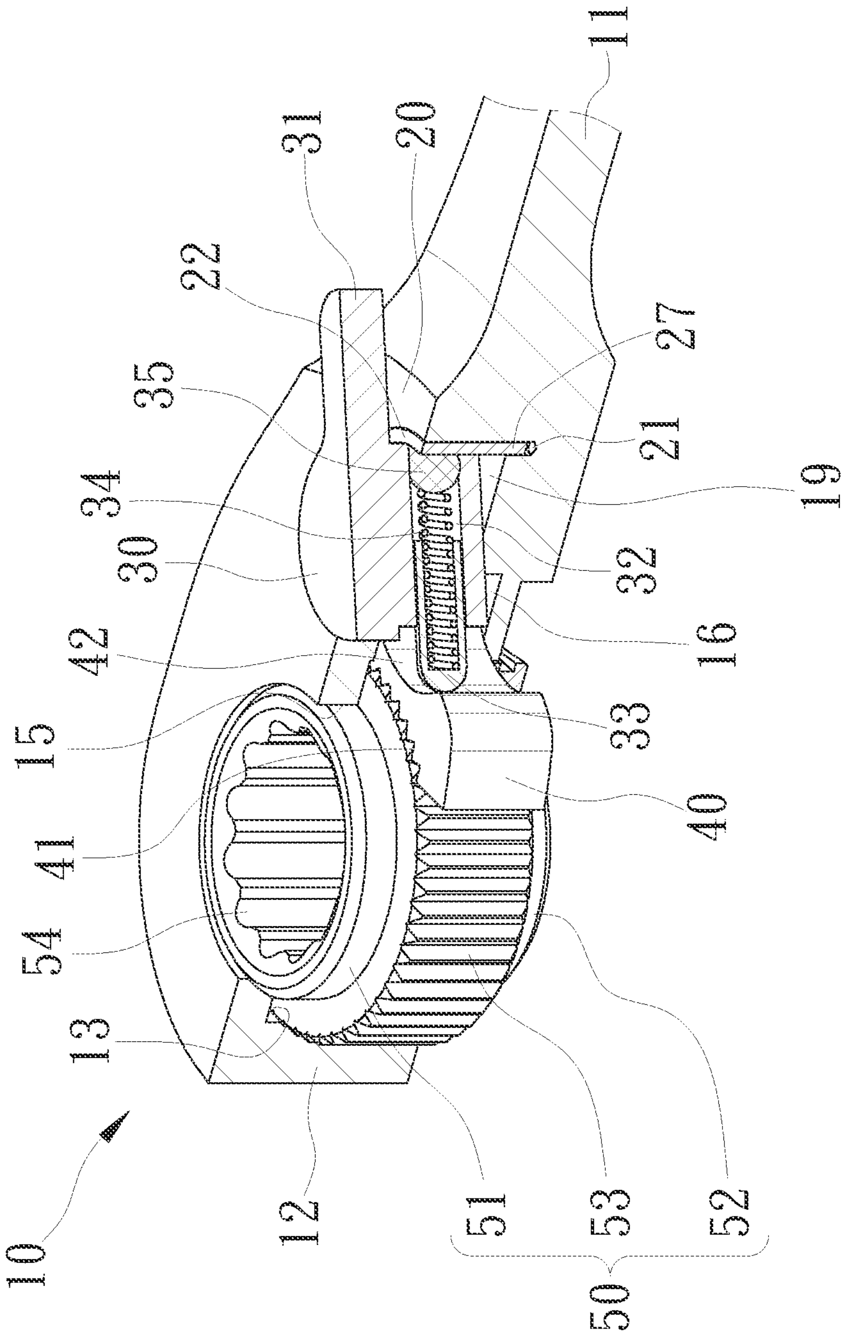
FIG. 1 is a cut-away view of a ratchet wrench according to the first embodiment of the present invention.
Figure 2:
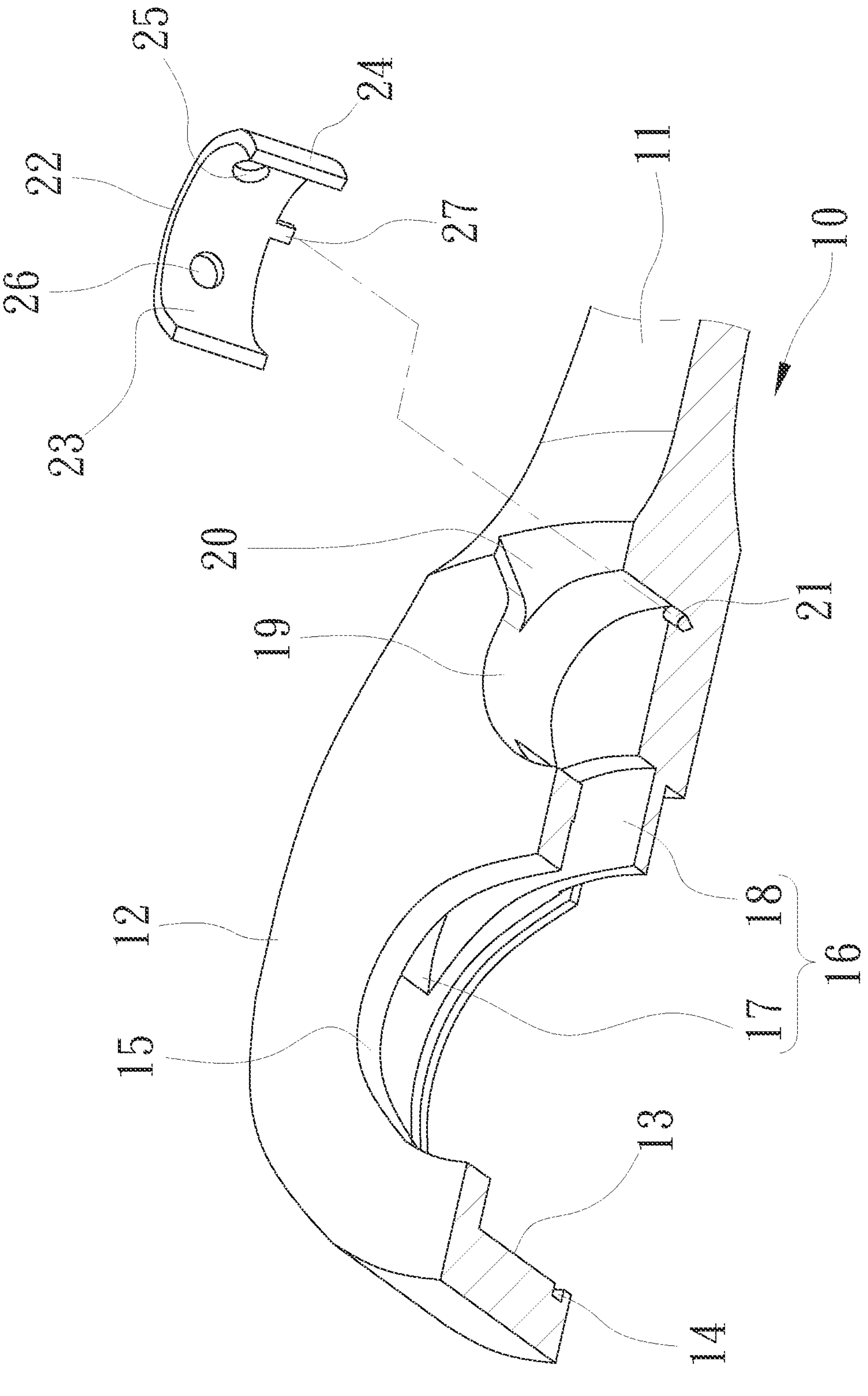
FIG. 2 is a cut-away view of a handle of the ratchet wrench shown in FIG. 1.

Referring to FIGS. 1, 2, 4 and 5, a ratchet wrench 10 includes a handle, a switch 30, a pawl 40 and a toothed wheel 50 according to a first embodiment of the present invention. The handle includes a head 12 formed at an end of a grip 11. The grip 11 is preferably solid element. The head 12 is a hollow element including a chamber 13, an opening 15, a pothole 19, a channel 16 and an aperture 20. The opening 15 is made in an upper face of the head 12. The chamber 13 is coaxial with the opening 15. A diameter of the chamber 13 is larger than that of the opening 15. The pothole 19 is also made in the upper face of the head 12. The pothole 19 is in communication with the chamber 13 via the channel 16 along a length of the handle. The channel 16 is crescent space with a broad section 18 between two tapered sections 17. The aperture 20 is in communication with the pothole 19 along the length of the handle. The pothole 19 is located between the aperture 20 and the channel 16.

The toothed wheel 50 is a hollow element formed with an upper axle 51, a lower axle 52, teeth 53 and an engagement portion 54. The teeth 53 are formed on the periphery of the toothed wheel 50 between the axles 51 and 52. The engagement 54 is a non-oval aperture.

The toothed wheel 50 is located in the chamber 13. The upper axle 51 is located in the opening 15. A ring 56 is also located in the chamber 13. A clip 55 includes an internal edge located in an annular groove made in an external face of the ring 56 and an external edge located in an annular groove 14 made in a wall of the chamber 13. Thus, the toothed wheel 50 is kept rotatable in the chamber 13.

The pawl 40 is formed with teeth 41 on a concave side and a recess 42 in a convex side. The pawl 40 is located in the channel 16. The teeth 41 are located in the chamber 13. The teeth 41 are engageable with some of the teeth 53. The recess 42 is in communication with the pothole 19.

The switch 30 includes a lever 31, a tunnel 32, a detent 33 and a spring 34. The lever 31 extends in a radial manner. The tunnel 32 extends along a diameter. The detent 33 is in the form of a rod including a first end located out of the tunnel 32 and a second end movable in the tunnel 32. The first end of the detent 33 is a rounded end. The spring 34 is located in the tunnel 32. Preferably, a first end of the spring 34 is located in a recess in the second end of the detent 33.

The switch 30 is rotationally located in the pothole 19. The lever 31 extends from the pothole 19 through the aperture 20. The first end of the detent 33 is located in the recess 42. The first end of the detent 33 is retained between two portions of the head 12 (FIG. 5), thereby keeping the switch 30 in the pothole 19 even in the case of fierce vibration of the ratchet wrench 10. The spring 34 is compressed between the detent 33 and a wall of the pothole 19.

As mentioned above, the switch 30 is rotatable relative to the head 12. As the spirit of the present invention, a ball 35 and an arched plate 22 are used to keep the switch 30 is a selected one of positions. The ball 35 includes a first portion in contact with a second end of the spring 34.

The arched plate 22 is formed with a concave face 23, a convex face 24, two bores 25 and 26 and a boss 27. The concave face 23 is located opposite to the convex face 24. The bores 25 and 26 are evenly made in the concave face 23. The boss 27 extends from a lower edge of the arched plate 22.

The arched plate 22 is located in the pothole 19. The boss 27 is located in a positioning dent 21 in a floor of the pothole 19 so that the arched plate 22 is not rotatable relative to the head 12.

In another embodiment, the bores 25 and 26 are made in a wall of the pothole 19. Hence, the arched plate 22 is saved.

In use, the engagement portion 54 of the toothed wheel 50 receives a threaded bolt, a nut or any other proper workpiece. The lever 31 is operated to locate the detent 33 in a selected one of three positions.

Figure 4:
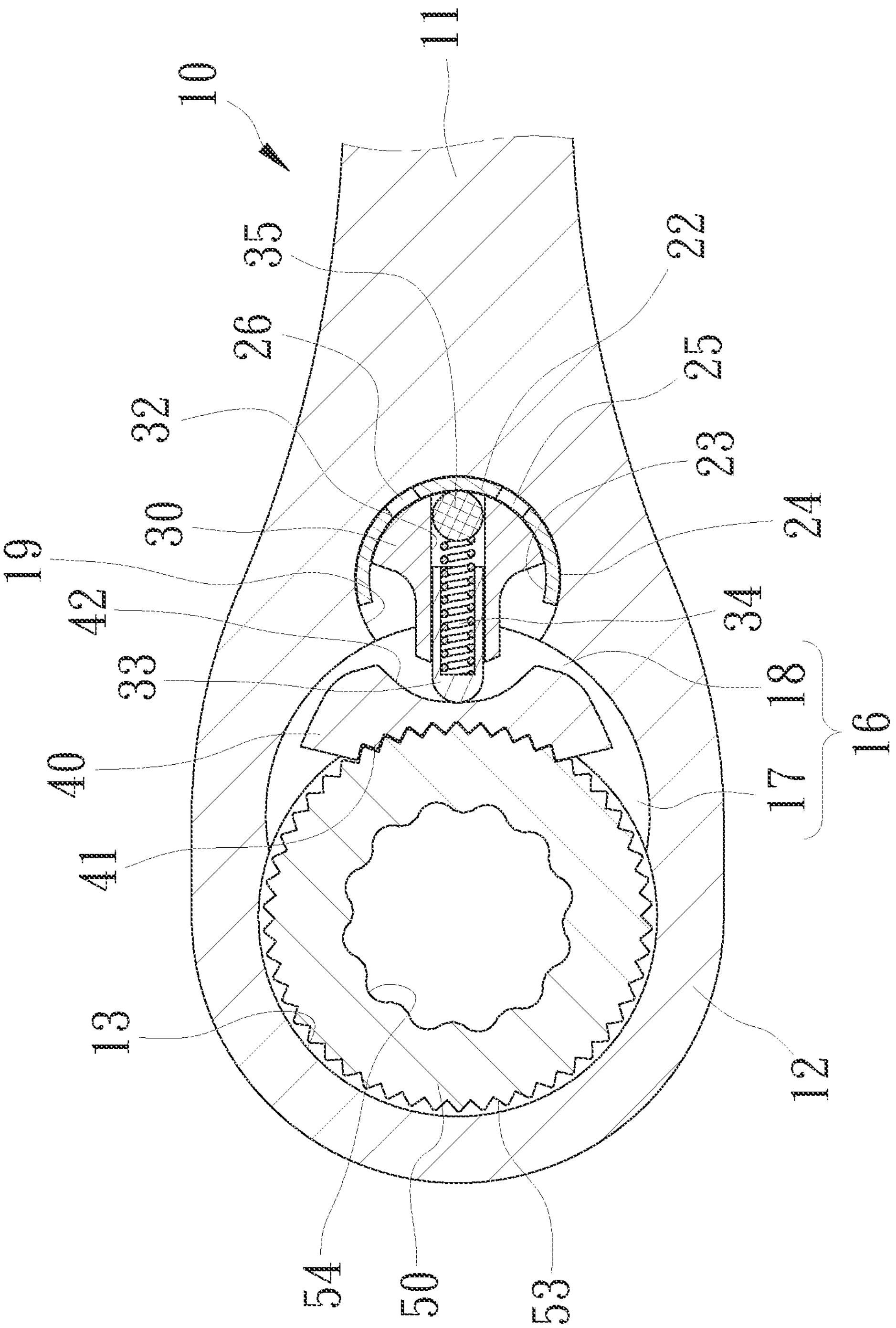
FIG. 4 is a cross-sectional view of the ratchet wrench in another position than shown in FIG. 3.
Figure 5:
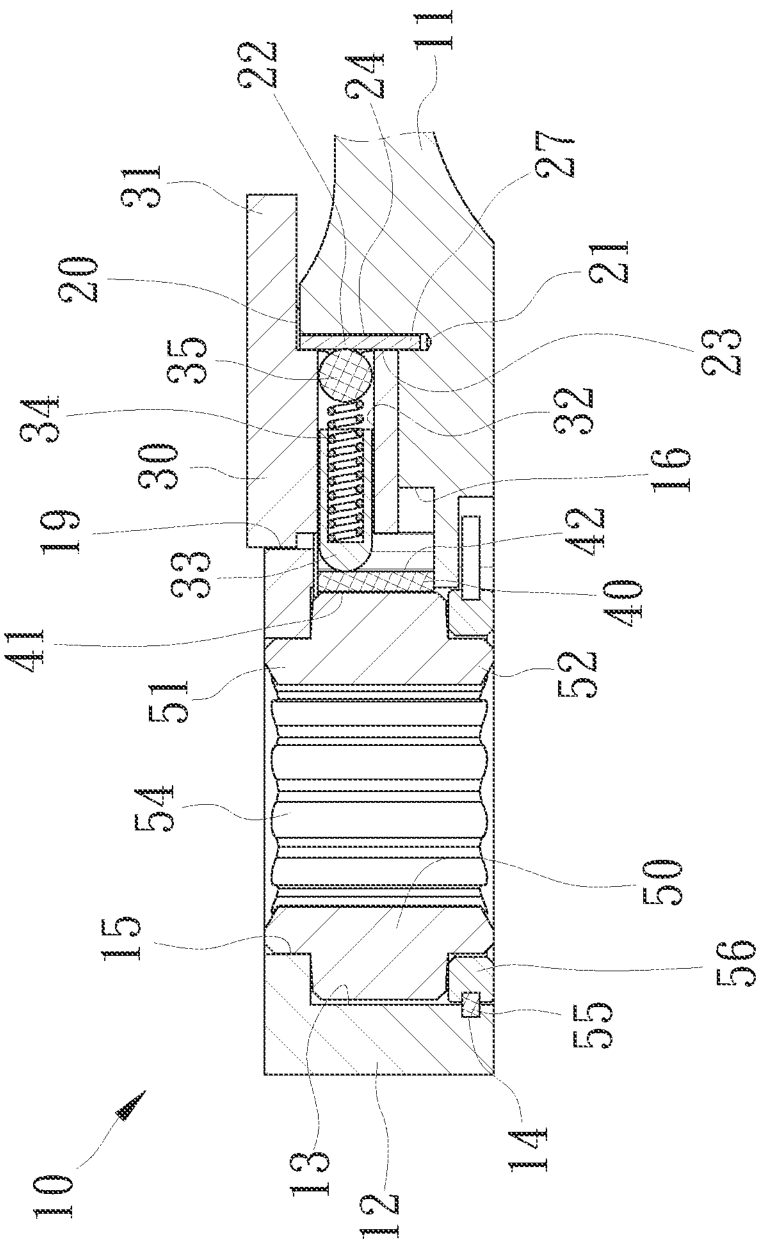
FIG. 5 is another cross-sectional view of the ratchet wrench shown in FIG. 4.

Referring to FIGS. 4 and 5, the detent 33 is in a neutral position where the ball 35 is located between the bores 25 and 26. That is, the ball 35 is not located in any of the bores 25 and 26. The grip 11 is pivotable to pivot the head 12 clockwise or counterclockwise, the toothed wheel 50 cannot be pivoted since the pawl 40 is allowed to disengage from the toothed wheel 50.

Figure 3:
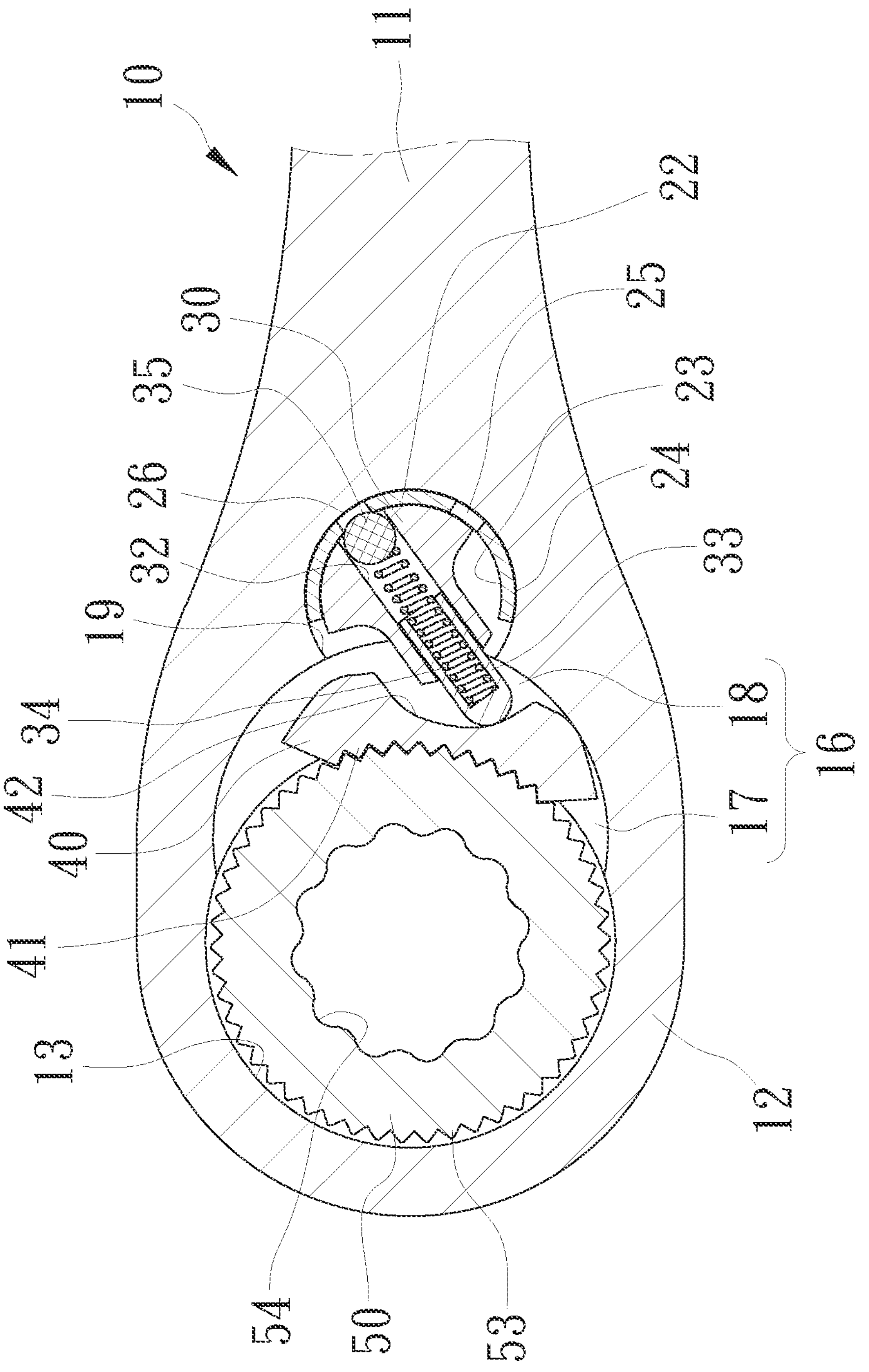
FIG. 3 is a cross-sectional view of the ratchet wrench shown in FIG. 1.

Referring to FIG. 3, the detent 33 is in a first active position where the ball 35 is located in the bore 26. The grip 11 is operated to pivot the head 12 counterclockwise. A first portion of the pawl 40 is jammed between the toothed wheel 50 and a wall of a first one of the tapered sections 17 of the channel 16. Thus, the head 12 pivots the toothed wheel 50 via the pawl 40. Then, the head 12 is pivoted clockwise. The first portion of the pawl 40 is not jammed between the toothed wheel 50 and the wall of the first one of the tapered sections 17 of the channel 16, i.e., the pawl 40 is allowed to disengage from the toothed wheel 50. Thus, the head 12 does not pivot the toothed wheel 50 via the pawl 40.

Figure 6:
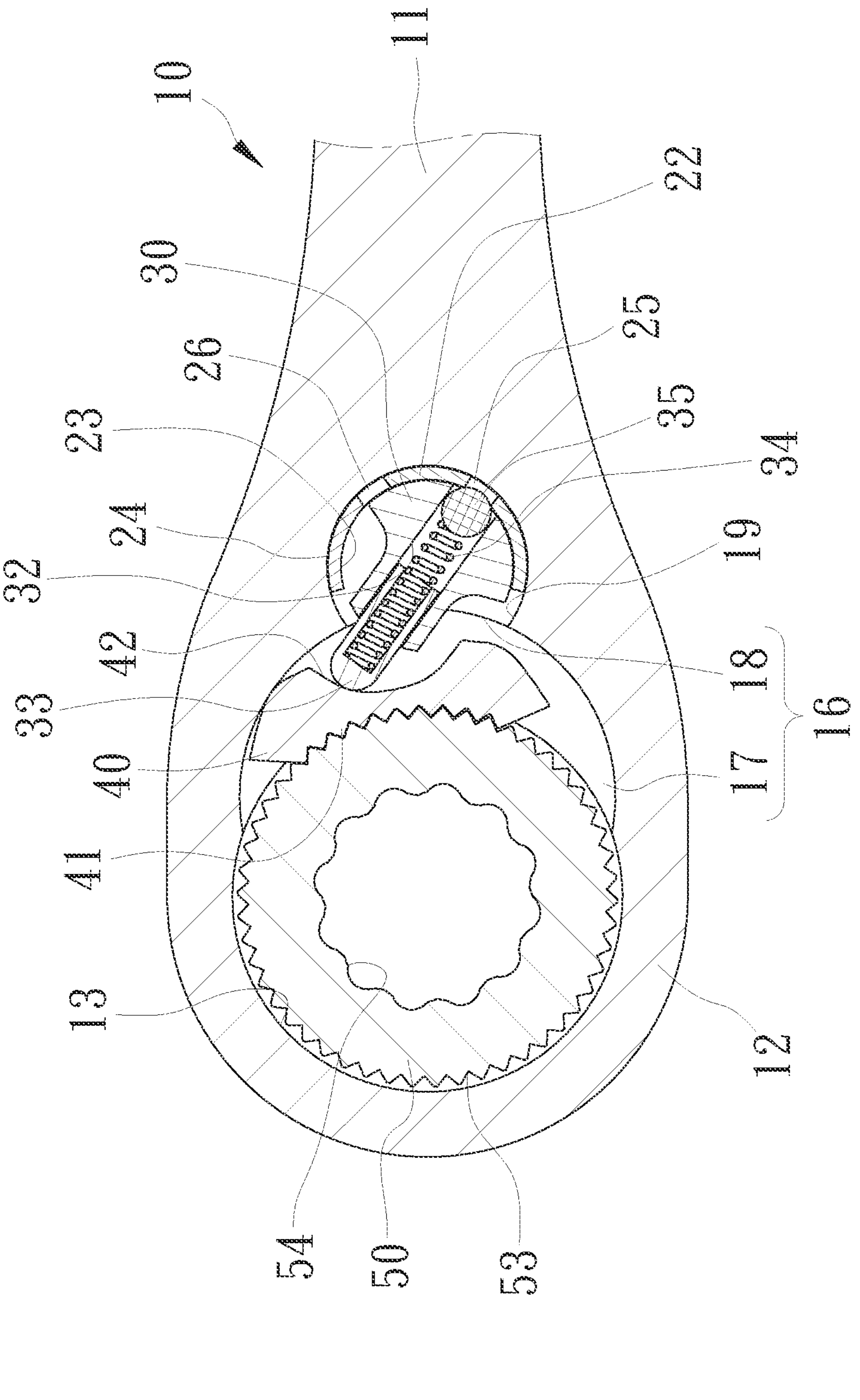
FIG. 6 is a cross-sectional view of the ratchet wrench in another position than shown in FIG. 4.

Referring to FIG. 6, the detent 33 is in a second active position where the ball 35 is located in the bore 25. The grip 11 is operated to pivot the head 12 clockwise. A second portion of the pawl 40 is jammed between the toothed wheel 50 and a wall of a second one of the tapered sections 17 of the channel 16. Thus, the head 12 pivots the toothed wheel 50 via the pawl 40. Then, the head 12 is pivoted counterclockwise. The second portion of the pawl 40 is not jammed between the toothed wheel 50 and the wall of the second one of the tapered sections 17 of the channel 16.

Figure 7:
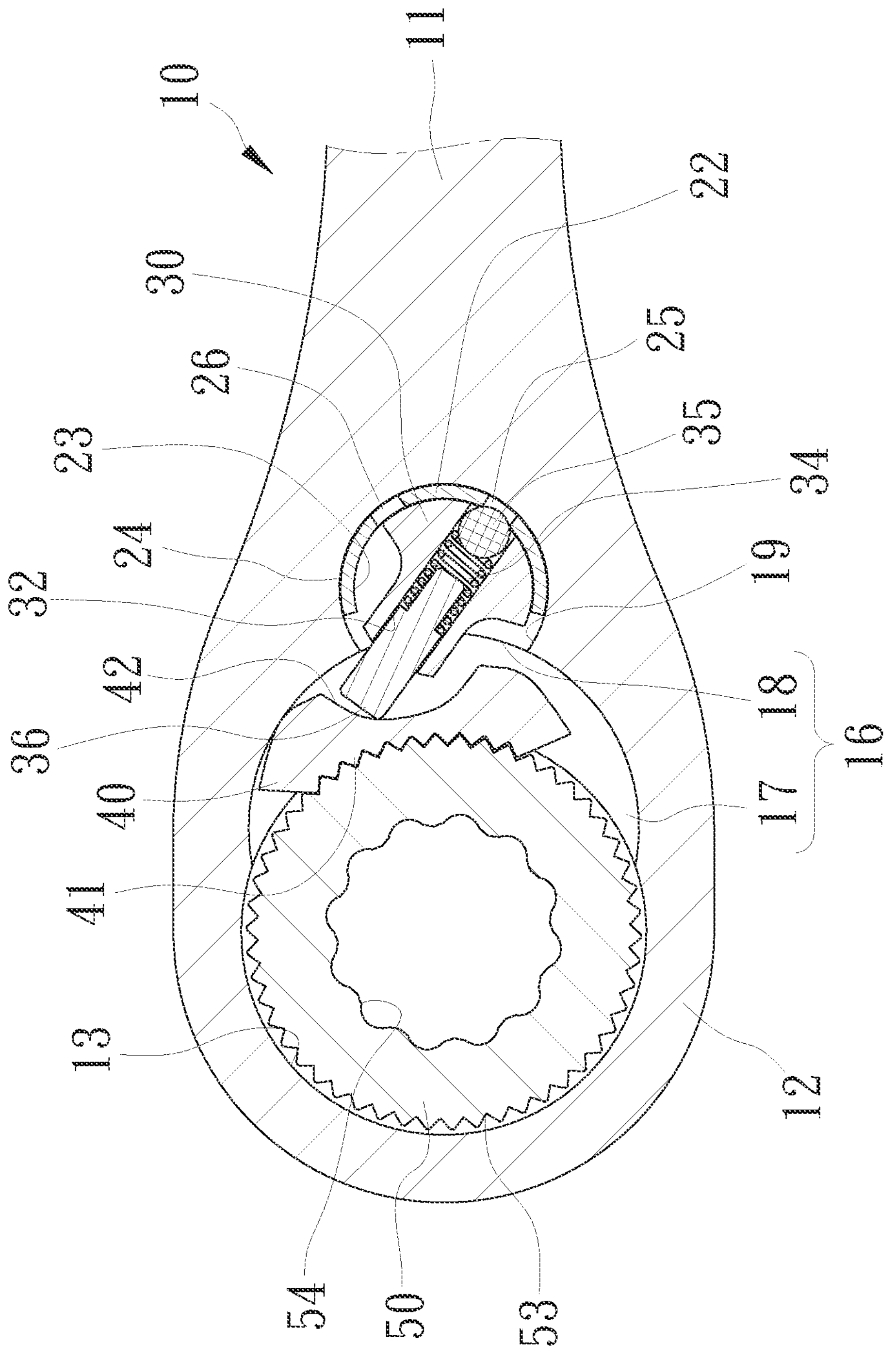
FIG. 7 is a cross-sectional view of the ratchet wrench according to the second embodiment of the present invention.
Figure 8:
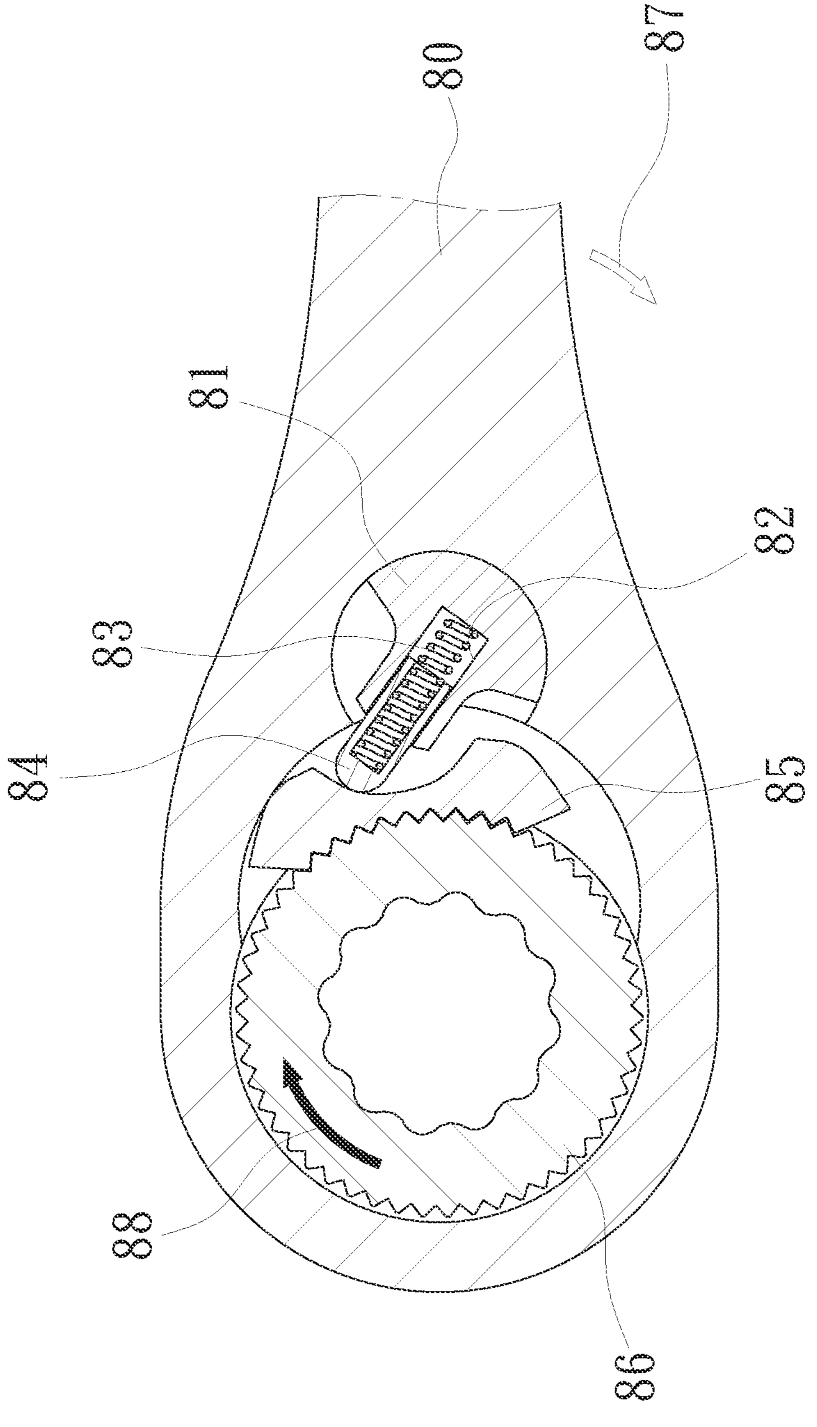
Fig. 8 PRIOR ART
FIG. 8 is a cross-sectional view of a conventional ratchet wrench.
Figure 9:
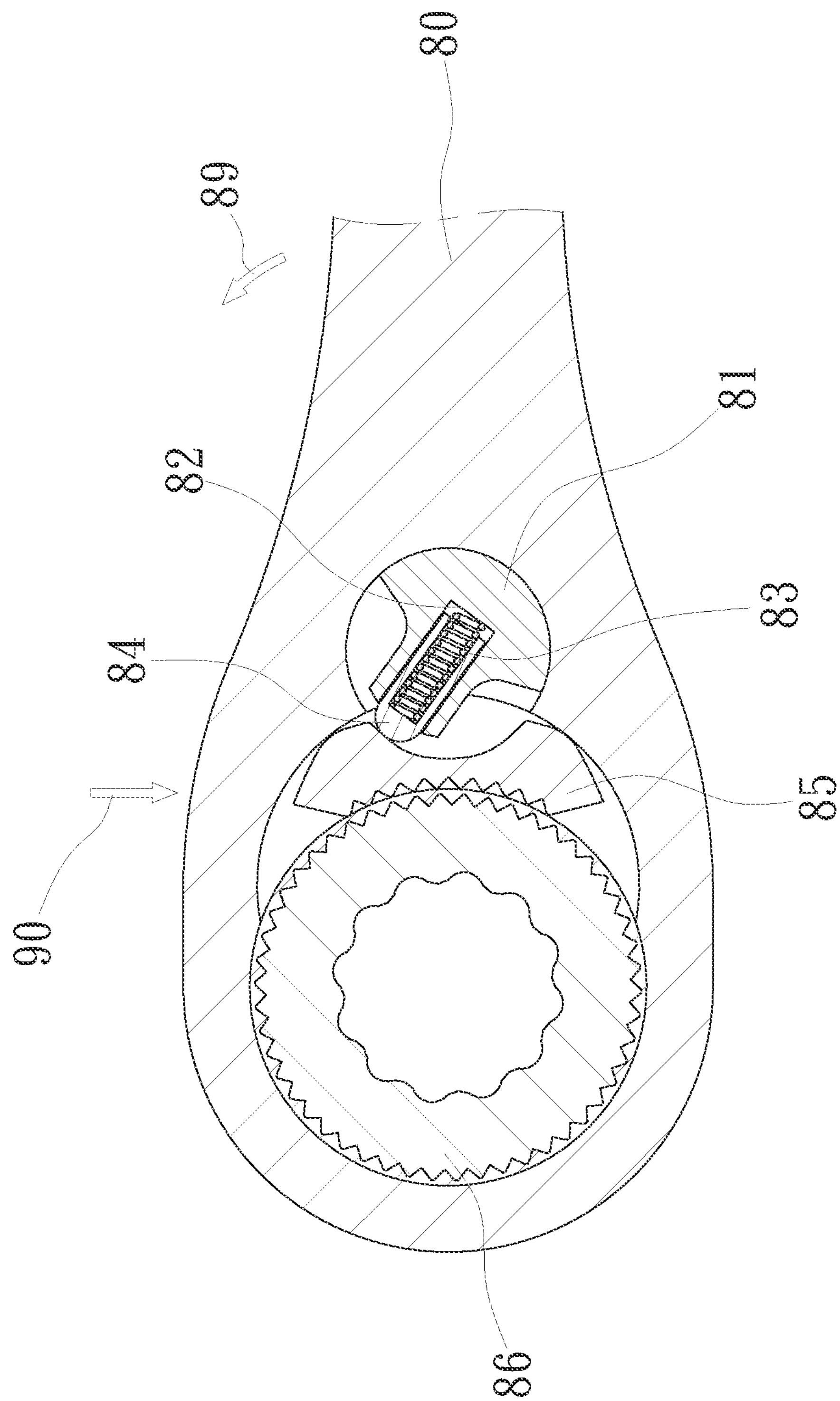
Fig. 9 PRIOR ART
FIG. 9 is a cross-sectional view of the ratchet wrench in another position than shown in FIG. 8.

Referring to FIG. 7, there is a ratchet wrench according to a second embodiment of the present invention. The second embodiment is identical to the first embodiment except for including a detent 36 instead of the detent 33. A first end of the detent 36 is a flat end. A second end of the detent 36 is a reduced end fitted in the first end of the spring 34.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A ratchet wrench comprising:
- a head comprising a chamber, a pothole, a channel via which the chamber is in communication with the pothole, and a positioning dent made in a floor of the pothole, wherein the channel comprises two tapered sections and a broad section between the tapered sections;
- a toothed wheel located in the chamber;
- a pawl movable between the tapered sections of the channel via the broad section;
- an arched plate extending between a wall of the pothole and a switch and comprising two bores in communication with the pothole and a boss inserted in the positioning dent to prevent the arched plate from rotation relative to the head; and
- the switch being pivotable in the pothole and comprising:
  - a tunnel with a first end in communication with the broad section of the channel and a second end in communication with the pothole;
  - a detent comprising a first end connected to the pawl and a second end movable in the tunnel;
  - a spring comprising a first end in contact with the second end of the detent and a second end; and
  - a ball comprising a first portion in contact with the second end of the spring and a second portion insertable in a selected one of the bores when the detent moves the pawl to a corresponding one of the tapered sections of the channel.

2. The ratchet wrench according to claim 1, wherein the switch comprises a lever extending over and hence keeping the arched plate in the pothole of the ratchet wrench.

3. The ratchet wrench according to claim 1, wherein the detent comprises an end located out of the switch and restrained between two portions of the head on upper and lower sides of the broad section of the channel, thereby keeping the switch in the head.

4. The ratchet wrench according to claim 1, wherein the detent is a hollow element for receiving a section of the spring.

5. The ratchet wrench according to claim 1, wherein the detent comprises a reduced end fitted in a section of the spring.

* * * * *